United States Patent
Gorenz et al.

(10) Patent No.: US 8,020,726 B1
(45) Date of Patent: Sep. 20, 2011

(54) POWDER DISPERSION SYSTEM

(75) Inventors: Heather M. Gorenz, Albuquerque, NM (US); John E. Brockmann, Albuquerque, NM (US); Daniel A. Lucero, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 487 days.

(21) Appl. No.: 11/873,689

(22) Filed: Oct. 17, 2007

Related U.S. Application Data

(60) Provisional application No. 60/852,555, filed on Oct. 18, 2006.

(51) Int. Cl.
*B67B 7/00* (2006.01)
*G01F 11/00* (2006.01)

(52) U.S. Cl. .......................................................... 222/1
(58) Field of Classification Search ................ 347/73; 222/1; 607/120
See application file for complete search history.

(56) References Cited

U.S. PATENT DOCUMENTS

| | | | | |
|---|---|---|---|---|
| 3,913,795 A * | 10/1975 | Coucher et al. | ............... | 406/134 |
| 4,586,854 A * | 5/1986 | Newman et al. | ............... | 406/153 |
| 4,953,792 A * | 9/1990 | Evans | ............... | 239/654 |
| 5,037,247 A * | 8/1991 | Kaiser et al. | ............... | 406/153 |
| 5,502,998 A * | 4/1996 | Miller et al. | ............... | 73/1.06 |
| 6,029,661 A * | 2/2000 | Whaley et al. | ............ | 128/203.15 |
| 6,159,188 A * | 12/2000 | Laibovitz et al. | ............. | 604/294 |
| 6,260,549 B1 * | 7/2001 | Sosiak | ............. | 128/200.23 |
| 6,451,784 B1 * | 9/2002 | Placke et al. | ................... | 514/184 |
| 6,501,052 B2 * | 12/2002 | Cox et al. | ...................... | 219/486 |
| 6,719,960 B1 * | 4/2004 | Hills et al. | ....................... | 424/46 |
| 2004/0215135 A1 * | 10/2004 | Sheldrake et al. | .............. | 604/68 |

FOREIGN PATENT DOCUMENTS
WO  WO 2004095379 A1 * 11/2004

OTHER PUBLICATIONS

Fox Valve, et al., "Fox Venturi Eductors", Fox Mini-Eductors for Aspirating, Sampling, Mixing, and Vacuum Generation, Product Brochure Undated.
KDS Scientific, et al., "KDS Model 210 Infusion Withdrawal Pumps", KDS Scientific Syringe Pumps and Dispensers, Product Brochure 2006.
TSI Inc., et al., "TSI Powder Dispersers—Model 3433", Model 3433 Small Scale Powder Disperser Brochure 2004.

* cited by examiner

*Primary Examiner* — Sean E Conley
*Assistant Examiner* — Regina Yoo
(74) *Attorney, Agent, or Firm* — Madelynne J. Farber

(57) ABSTRACT

A powder dispersion method and apparatus comprising an air eductor and a powder dispensing syringe inserted into a suction connection of the air eductor.

8 Claims, 6 Drawing Sheets

POWDER DISPERSION SYSTEM

CROSS-REFERENCE TO RELATED APPLICATIONS

This application claims priority to and the benefit of the filing of U.S. Provisional Patent Application Ser. No. 60/852,555, entitled "Powder Dispersion System", filed on Oct. 18, 2006, and the specification and claims thereof are incorporated herein by reference.

INCORPORATION BY REFERENCE OF MATERIAL SUBMITTED ON A COMPACT DISC

Not Applicable.

STATEMENT REGARDING FEDERALLY SPONSORED RESEARCH OR DEVELOPMENT

The Government has rights to this invention pursuant to Contract No. DE-AC04-94AL85000 awarded by the U.S. Department of Energy.

COPYRIGHTED MATERIAL

Not Applicable.

BACKGROUND OF THE INVENTION

1. Field of the Invention (Technical Field)

The present invention relates to aerosol powder dispersion systems.

2. Description of Related Art

Commercially available aerosol powder dispersion devices such as TSI Incorporated's small scale powder disperser, fluidized beds, and dry powder inhalers disperse relatively low quantities of powder. TSI's Fluidized Bed Aerosol Generator produces concentrations from 10-100 mg/m$^3$ or 3-30 mg/min and the TSI Small-Scale Powder Disperse generates concentrations from 0.3-40 mg/m$^3$ which is 3 to 90 mg/hour. The present invention economically provides dispersion rates of at least 170 mg/minute.

BRIEF SUMMARY OF THE INVENTION

The present invention is of a powder dispersion method and apparatus comprising: an air eductor; and a powder dispensing syringe inserted into a suction connection of the air eductor. In the preferred embodiment, a linear pump supplies powder to the eductor, most preferably a syringe pump. A fan drives air past a discharge connection of the air eductor. A housing is employed with an inlet for ambient air for the fan and an outlet for a mixture of powder and air from the fan to the ambient environment. Wheels are provided on the housing to greatly increase mobility. The housing additionally holds the linear pump, an air compressor, and a power supply. The invention disperses powders comprising particles of from approximately 1 to 10 microns at a rate of at least approximately 170 mg/minute, most preferably at least approximately 200 mg/minute. The syringe preferably has had its front end machined off. The air eductor comprises a Venturi tail. The air eductor is provided with a holder, preferably comprising a top and a bottom, wherein the top comprises a single channel and the bottom comprises a matching channel and a connecting downward-extending channel.

The invention is also of a powder dispersion method and apparatus comprising: an air eductor; a powder dispensing syringe inserted into a suction connection of the air eductor; and a fan driving air past a discharge connection of the air eductor. In the preferred embodiment, a syringe pump moves the powder in the syringe to the air eductor.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 2:
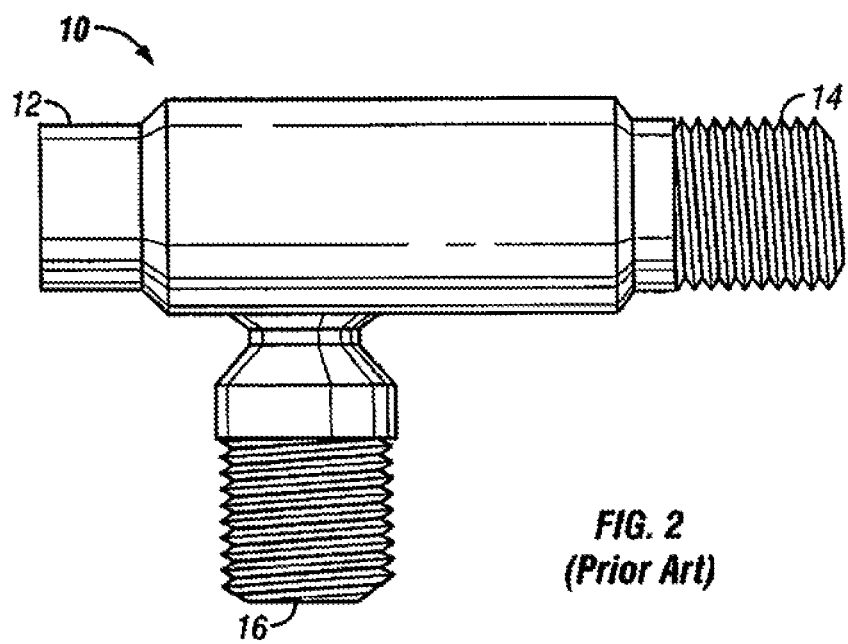
FIG. 2 is a side view of the preferred air eductor used with the invention (a Fox Valve Development Corp. air eductor)
Figure 3:
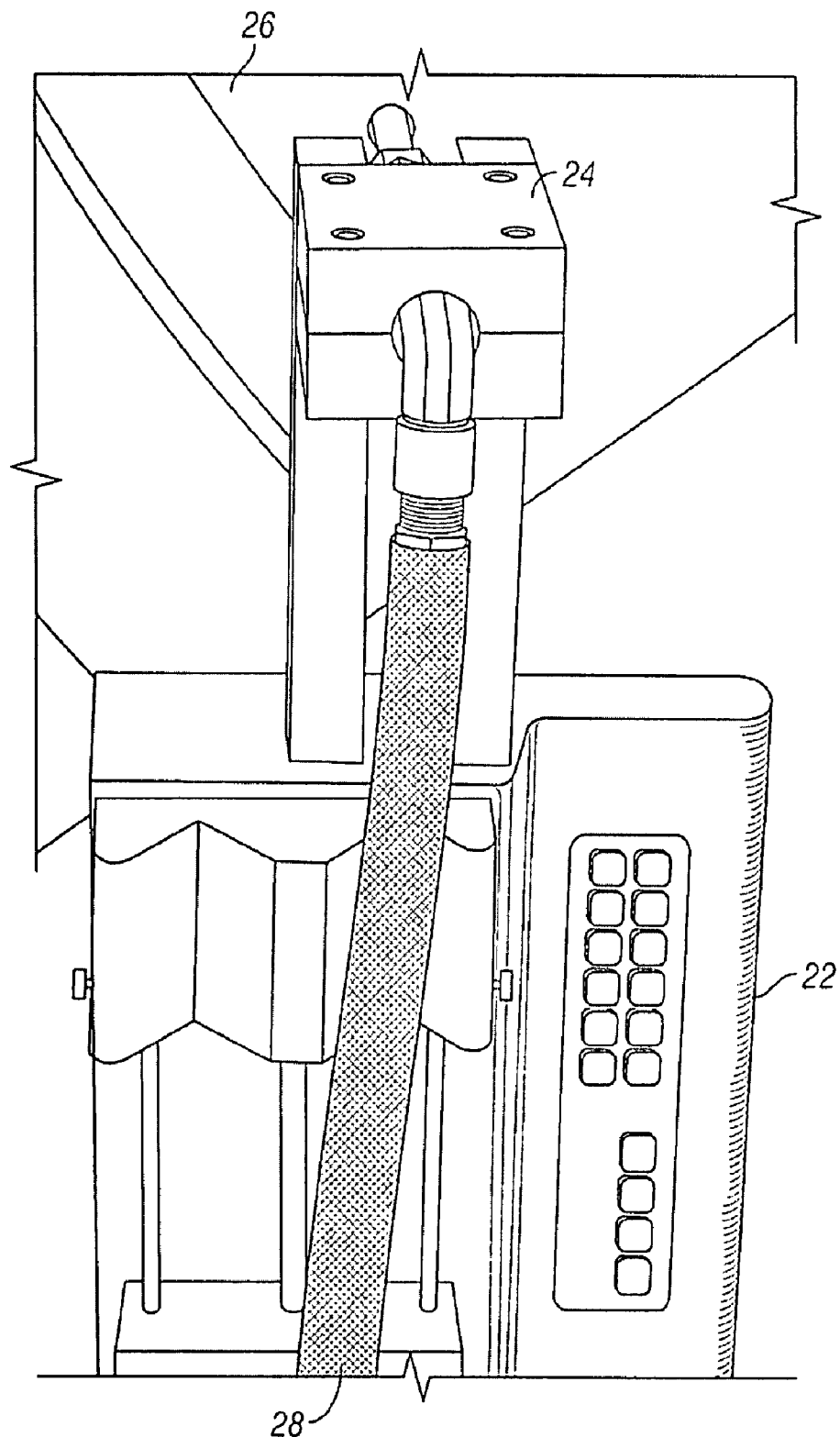
FIG. 3 is a front view of the combination of the invention comprising a syringe pump, air eductor, and air eductor holder.
Figure 4:
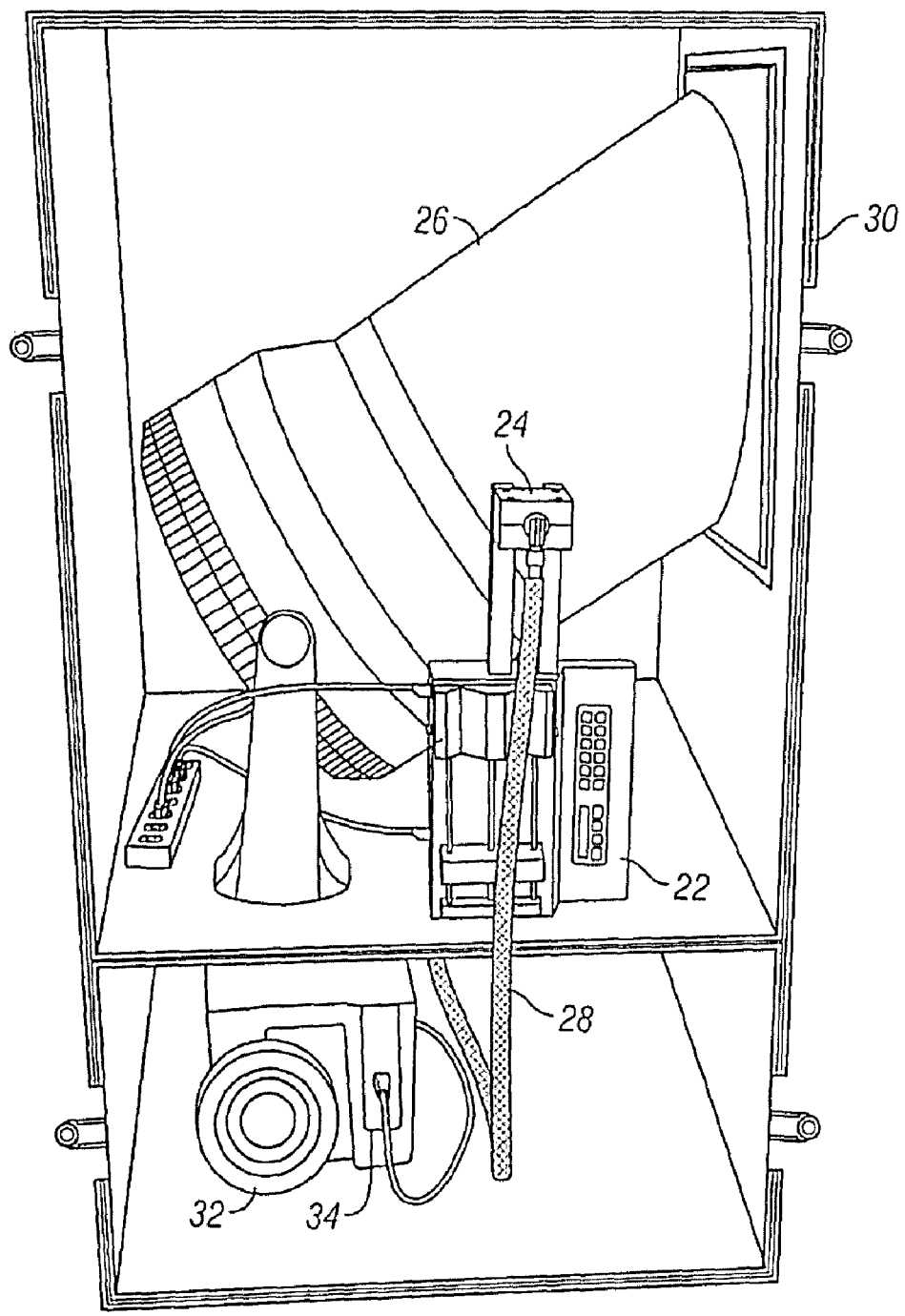
FIG. 4 is a front view of the combination of the invention comprising the combination of FIG. 3, a fan, a power source, and a casing.
Figure 5:
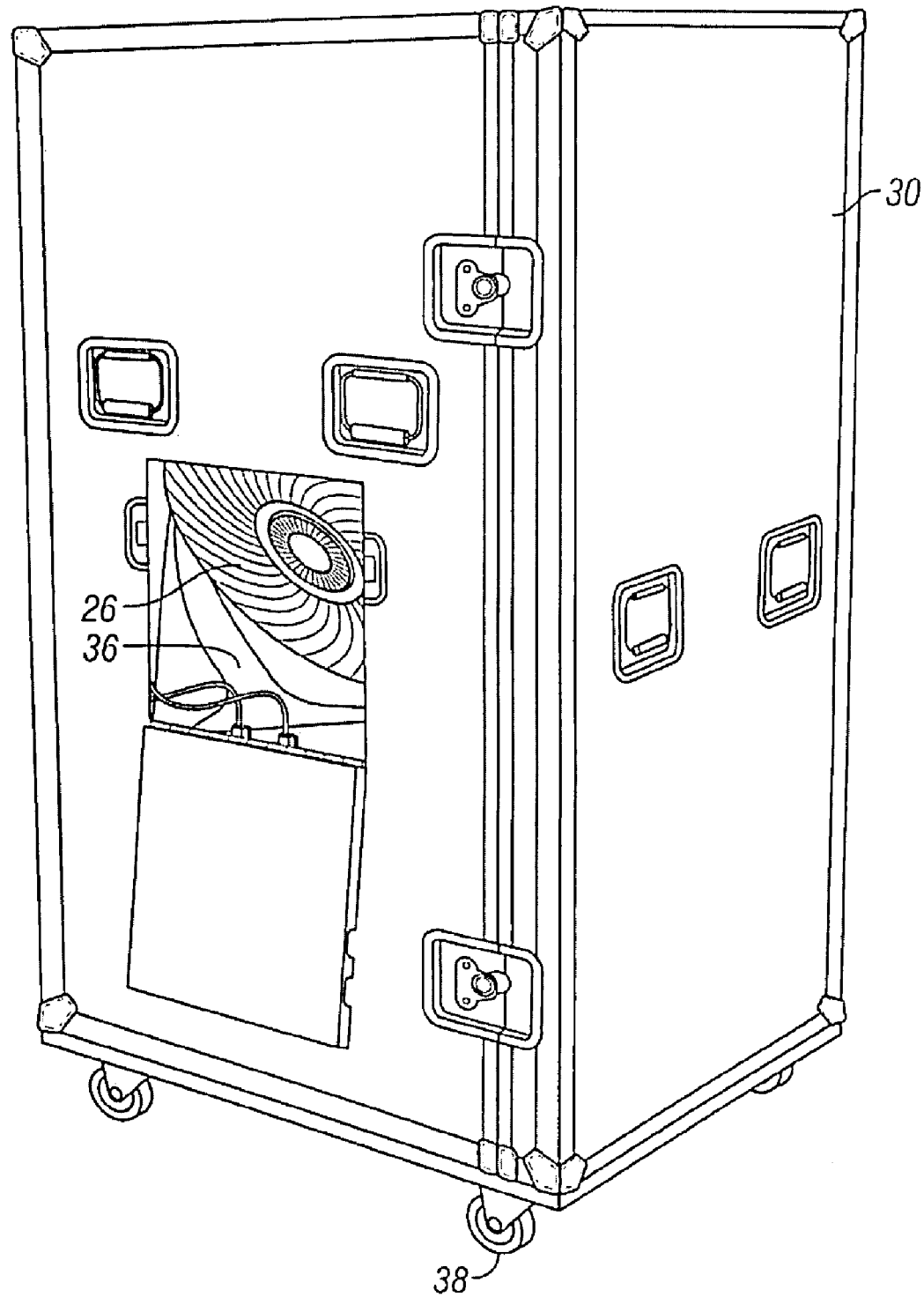
FIG. 5 is a perspective view of the combination of FIG. 4 showing the preferred door in the casing.
Figure 6:
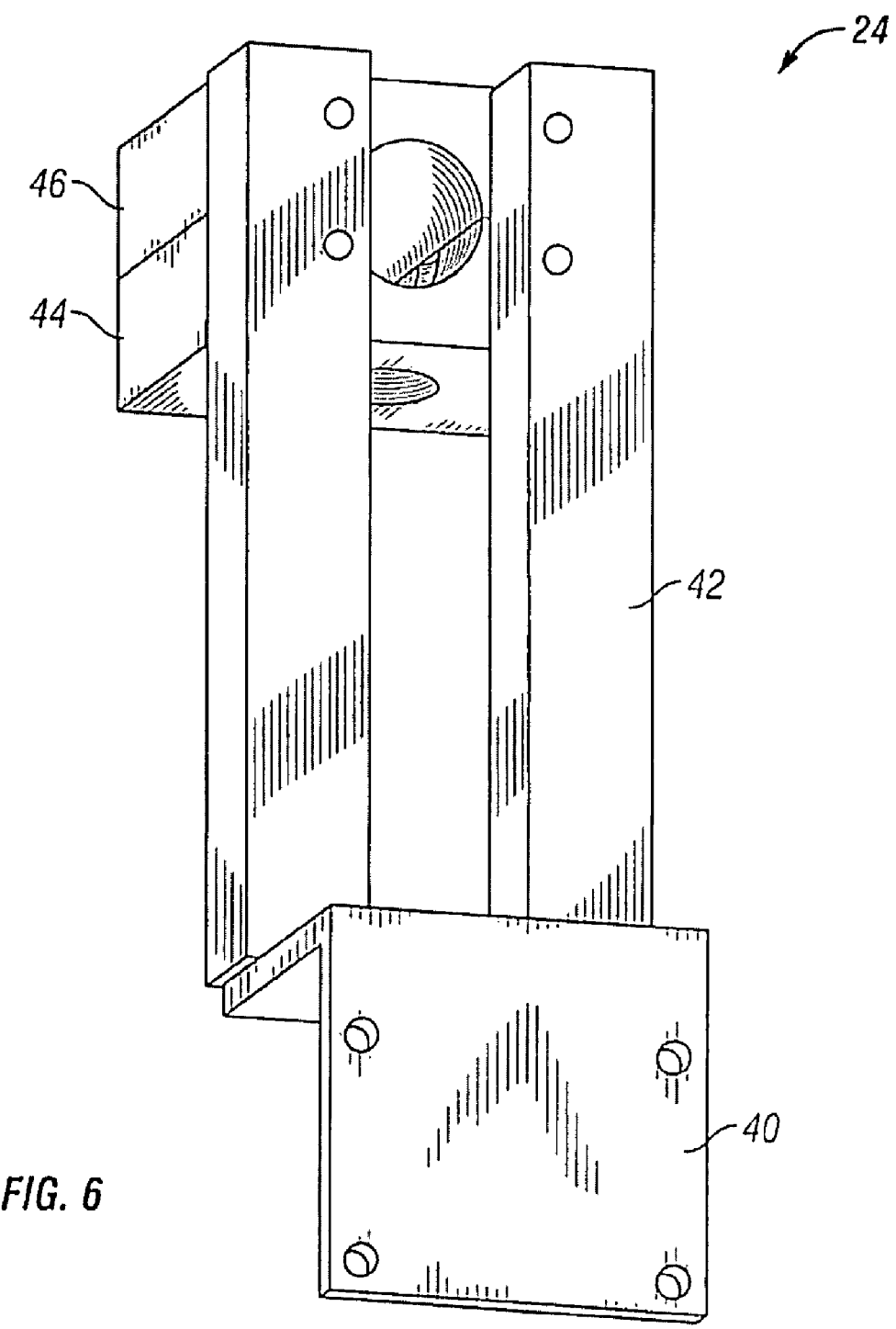
FIG. 6 is a rear perspective view of the air eductor holder of the invention.
Figure 7:
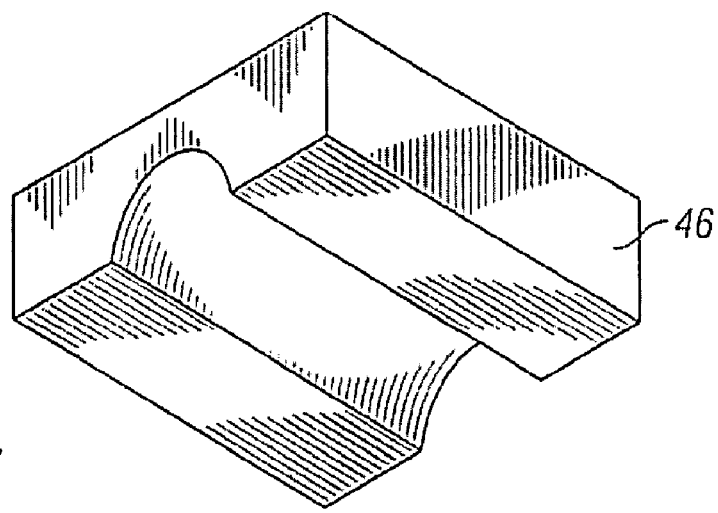
FIG. 7 is a bottom perspective view of the top of the holder.
Figure 8:
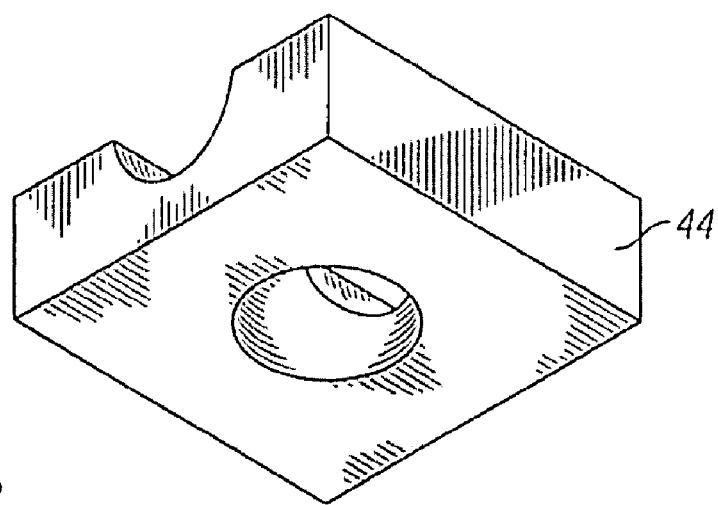
FIG. 8 is a bottom perspective view of the bottom of the holder.

The present invention is of an aerosol powder dispersion system capable of dispersing powdered material with a size range down to about a micron at a rate of at least approximately 170 mg/minute and preferably of at least approximately 200 mg/minute. It preferably employs an air eductor (most preferably by Fox Valve Development Corp., most preferably; see FIG. 2), which subjects particles to high shear in order to break apart agglomerates, in combination with syringe injection of powder. The dispersion system is preferably housed in a case with wheels to facilitate portability. The housing also keeps the unit and contents clean in a controlled environment while directing the particulate flow away from the ground.

The dispersion unit of the invention is designed to aerosolize powdered material at a nominal rate of approximately 200 mg/minute, preferably with powder having a mass mean particle size of approximately 5 microns being aerosolized, and preferably with a concentration of material in the output flow averaging less than approximately 5 mg/m$^3$, and preferably being self-contained and portable.

Figure 1:
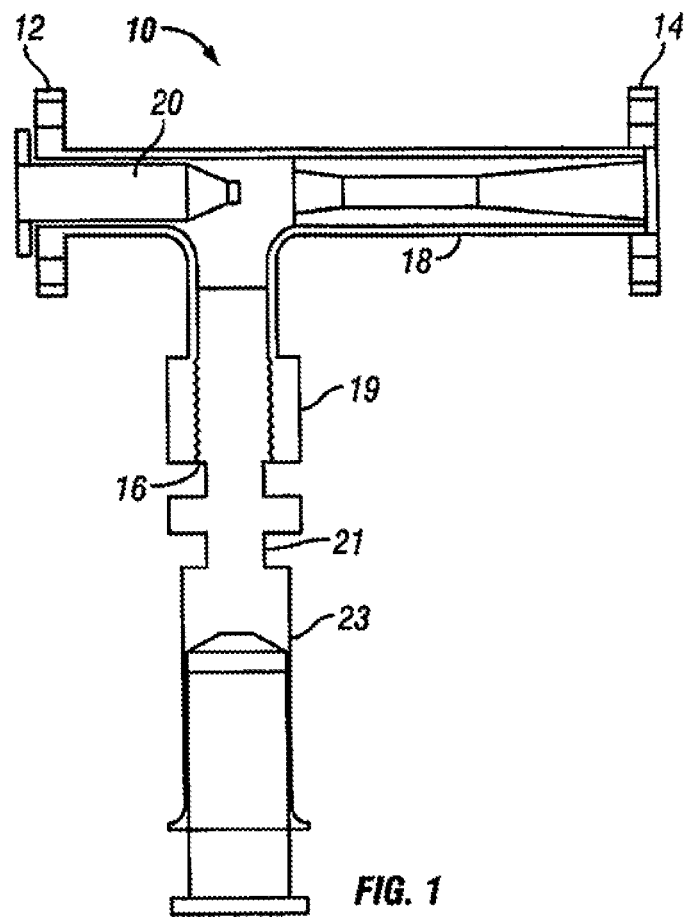
FIG. 1 is a side sectional view of the preferred air eductor and modified syringe of the present invention.

Referring to FIG. 1, the dispersion device 10 employs an air eductor (comprising motive connection 12, discharge connection 14, suction connection 16, and Venturi tail 18) that subjects particles to high shear in order to break apart agglomerates, in combination with motive air nozzle 20. The dispersion device was characterized using a variety of powders. How well the powder is dispersed depends on the characteristics of the powder, such as particle size, particle shape, electrostatic effect and moisture content. The air supply to the air eductor preferably comes from an oil-less linear pump operated by a battery-based power supply.

How well the powder is dispersed depends on the characteristics of the powder, such as particle size, particle shape, electrostatic effect and moisture content. The air supply to the air eductor preferably comes from an oil-less linear pump operated by a battery-based power supply.

An important element of producing a known and controlled aerosol generation rate is the powder feed system. Preferably, as shown in FIG. 3, a KD Scientific model 210 2-position syringe pump 22 (or other syringe or linear pump) is used to introduce the powder to the eductor and to control the delivery rate. A syringe is preferably used with the tip cut off to avoid powder compaction; this delivers the powder to the air eductor. As shown in FIGS. 3-5, the dispersion system comprising the air eductor, air eductor holder 24, the syringe pump, the air compressor 32, air compressor line 28, the fan 26, and the power supply 34 is preferably housed in a case 30 with wheels 38 to facilitate portability. The goal of the housing is to keep the unit and contents in a clean and controlled environment and to disperse the aerosol powder at some height a few feet above the ground.

An altered 60 cc syringe 23 is preferably used to entrain the powder. The front end of the syringe is preferably machined off and a plastic female plug glued into the syringe barrel. A male cap can be screwed into the plug to keep the contents of the syringe dry and secure while not in use. For variability the amount of powder dispersed may be controlled by changing the size of the syringe and the feed rate of the syringe pump. The air eductor suction connection 16 is preferably adapted with swagelok ½ National Pipe Tapered Thread (NPT) 19 and ½ inch tubing 21 which fits into the syringe 23 and will entrain powder that is within ¾ inch of the tube inlet. The air eductor discharge connector is also fitted with a swagelok ½ NPT that connects to ½ inch tubing that feeds at 90 degrees angle into the duct work of an Air King 20 inch diameter 1200 cfm fan. The ducting connects the fan at an angle to a 21 by 21 inch port hole out of the system. The fan is used to help mix and disperse the powder. A Gast Manufacturing large capacity oil-less compressor is preferably used to supply air at approximately 187 lpm to the inlet of the air eductor. The air compressor preferably runs at less than approximately 53 decibels without drawing too much current. In order to make the system completely self-sufficient an XPower Powerpack is preferably used to run the syringe pump, the linear pump, and the fan.

The use of a syringe pump to move the powder to the inlet of the air eductor at a controlled rate and the configuration of the eductor inlet in the mouth of the powder containing cylinder are important features of the invention. The use of the fan to provide dilution/mixing/transport air flow to produce an aerosol at acceptable concentration levels while generating high powder throughput is another important feature.

As showing in FIGS. 6-8, a holder 24 is preferably employed to attach to the syringe pump so as to position the air eductor in the center of the syringe outlet. It preferably comprises a 3 inch by 3 inch aluminum angle bracket 40, with one side having four ¼ 20 inch holes that attach the holder to the syringe pump and one side having two ¼ 20 inch holes two in the front corners. The holder also comprises two 1 by 1 by 7 inch aluminum rods 42 that screw into the two corner holes on the angle bracket. Attached on the side of the two aluminum square rods at the top is the bottom piece 44 that holds the air eductor. The bottom piece preferably comprises 3 by 3 by 1 inch high aluminum. In the center of the 3 by 3 inch side is a 1 inch through hole and on the 1 inch side there is a through radius of 0.5 degrees in the center. There is a top piece 46 that fits on top of the bottom piece with the same dimensions and same through radius on the 1 inch side. The top piece screws onto the bottom piece, and the air eductor fits snugly in between these two pieces. The rods are preferably connected to the bottom holder with (e.g., 2¼-20) tapped holes and hex screws and the lop and bottom are also preferably connected with (e.g., 4¼-20) tapped holes and hex screws.

The case preferably has the following characteristics. The case itself is 58 inches tall, 31 inches wide and 34.5 inches deep. A door can be put into one of the 58 inch sides to allow for equipment accessibility. The door preferably comes completely off with latches to reattach it. Inside the door a peep hole is preferably placed 22 inches from the bottom of the case and 8 inches in to allow viewing of the syringe pump's LCD. The inside of the housing is preferably carpeted to help absorb sound from the equipment. There is preferably a shelf that is 16 inches from the bottom of the case. The power supply and the air compressor can be stored under this shelf with room for supplies for the system. On top of this shelf sits the fan along with ducting and the syringe pump holder system. There are two port holes to allow flow through the housing. They are connected to the case with a hinge on the bottom and latches on the sides. A 15 by 15 inch port hole 36 is preferred to supply air to the fan and access to a power strip. Across on the opposite wall is a 21 by 21 inch port hole inserted to allow the particulate to exit the system. A power strip is plugged into the power supply and the fan, syringe pump, and air compressor are plugged into the power strip. The strip is placed just behind the port that supplies air to the fan to allow all of the equipment to be turned on without taking off the door. At the bottom of the case on each corner are 3 inch swivel casters to facilitate portability. The preferred dispersion system is shown in FIG. 4.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A powder dispersion method comprising the steps of
providing an air eductor;
inserting a powder dispensing syringe into a suction connection of the air eductor;
supplying powder to the syringe; and
ejecting powder from the syringe by movement of a piston of the syringe toward a tip of the syringe into the suction connection of the air eductor.

2. The method of claim 1 wherein the supplying step comprises using a linear pump to supply powder to the syringe.

3. The method of claim 2 wherein the linear pump is a syringe pump.

4. The method of claim 1 additionally comprising the step of driving air past a discharge connection of the air eductor.

5. The method of claim 4 wherein the driving step comprises employing a housing with an inlet for ambient air and an outlet for a mixture of powder and air driven by a fan to the ambient environment.

6. The method of claim 4 wherein the method disperses powders comprising particles of from approximately 1 to 10 microns at a rate of at least approximately 170 mg/minute.

7. The method of claim 1 wherein the syringe has had its front end machined off.

8. The method of claim 1 additionally comprising employing an air eductor holder comprising a top and a bottom, wherein the top comprises a single channel and the bottom comprises a matching channel and a connecting downward-extending channel.

* * * * *